United States Patent
Channappagoudar et al.

(10) Patent No.: US 12,314,125 B2
(45) Date of Patent: May 27, 2025

(54) SYSTEMS AND METHODS FOR AUTOMATED ANOMALY DETECTION IN UNIVARIATE TIME-SERIES

(71) Applicant: Walmart Apollo, LLC, Bentonville, AR (US)

(72) Inventors: Manjunath Channappagoudar, Bangalore (IN); Arvind Shyam Verma, Bengaluru (IN); Mohit Choudhary, Bentonville, AR (US); Jingying Zhang, Beaumont, TX (US); Juan Gomez, Bentonville, AR (US); Lokesh Kumar Sambasivan, Tirupati (IN)

(73) Assignee: Walmart Apollo, LLC, Bentonville, AR (US)

( * ) Notice: Subject to any disclaimer, the term of this patent is extended or adjusted under 35 U.S.C. 154(b) by 46 days.

(21) Appl. No.: 18/360,704

(22) Filed: Jul. 27, 2023

(65) Prior Publication Data

US 2025/0036508 A1 Jan. 30, 2025

(51) Int. Cl.
*G06F 11/00* (2006.01)
*G06F 11/07* (2006.01)
*G06F 16/2458* (2019.01)

(52) U.S. Cl.
CPC ........ *G06F 11/079* (2013.01); *G06F 16/2474* (2019.01)

(58) Field of Classification Search
CPC ................ G06F 11/079; G06F 16/2474
USPC ..................................... 714/1–57
See application file for complete search history.

(56) References Cited

U.S. PATENT DOCUMENTS

| 7,388,393 B2 * | 6/2008 | Yamamoto | G11C 29/56 365/201 |
| 11,631,014 B2 | 4/2023 | Stocker et al. | |
| 2012/0278663 A1 * | 11/2012 | Hasegawa | G06F 11/079 714/47.1 |

(Continued)

OTHER PUBLICATIONS

Microsoft Cognitive Services, "Anomaly Detector V1.1-preview.2," (2023), 6 pages.

(Continued)

*Primary Examiner* — Sarai E Butler
(74) *Attorney, Agent, or Firm* — Morgan, Lewis & Bockius LLP; Manita Rawat

(57) ABSTRACT

Systems and methods of anomaly detection in time-series are disclosed. A time-series dataset is received and a set of segments is iteratively defined from the time-series dataset by identifying a set of changepoints in the time-series dataset based on a changepoint type and a sensitivity parameter, determining whether the set of segments defined by the changepoints satisfy at least one threshold criteria, and modifying the sensitivity parameter when the threshold criteria is not met or outputting the set of segments when the threshold criteria is met. A segment-specific anomaly detection threshold is determined for each segment in the set of segments and a set of anomaly-flagged segments is generated. The set of anomaly flagged segments are generated by an anomaly detection process based on the segment-specific anomaly detection threshold for a corresponding segment. An anomaly-flagged time-series is generated by combining the set of anomaly-flagged segments.

20 Claims, 10 Drawing Sheets

(56) References Cited

U.S. PATENT DOCUMENTS

| | | | |
|---|---|---|---|
| 2015/0271008 A1* | 9/2015 | Jain | H04L 41/0661 |
| | | | 714/57 |
| 2016/0004587 A1* | 1/2016 | Agrawal | G06F 3/0652 |
| | | | 714/6.11 |
| 2016/0364750 A1* | 12/2016 | Malloy | H04L 63/1425 |
| 2019/0294523 A1* | 9/2019 | Ajiro | G06F 11/0778 |
| 2021/0136098 A1 | 5/2021 | Stergioudis et al. | |
| 2022/0066888 A1* | 3/2022 | Chakrabarty | G06N 20/10 |
| 2022/0237069 A1* | 7/2022 | Freeman | G06F 11/3409 |
| 2022/0319304 A1* | 10/2022 | Menzel | G01R 31/40 |
| 2022/0383033 A1* | 12/2022 | Courtney | G06F 18/15 |
| 2023/0029794 A1 | 2/2023 | Huang et al. | |
| 2023/0229550 A1* | 7/2023 | Zhao | H04L 63/1425 |
| | | | 714/33 |
| 2023/0281068 A1* | 9/2023 | Friedrich | G06F 11/076 |
| | | | 714/57 |
| 2024/0273558 A1* | 8/2024 | Love | G06Q 30/0206 |

OTHER PUBLICATIONS

A. Fisch et al., "Subset Multivariate Collective And Point Anomaly Detection," Sep. 5, 2019, 51 pages.

K. Haynes et al., "Computationally Efficient Changepoint Detection for a Range of Penalties," Oct. 23, 2015, 31 pages.

A. Fisch et al., "A linear time method for the detection of collective and point anomalies," Stat Anal Data Min: The ASA Data Sci Journal, (2021), pp. 494-508.

R. van Leeuwen et al., "Anomaly detection in univariate time series incorporating active learning," Journal of Computational Mathematics and Data Science 6, (2023), 9 pages.

\* cited by examiner

SYSTEMS AND METHODS FOR AUTOMATED ANOMALY DETECTION IN UNIVARIATE TIME-SERIES

TECHNICAL FIELD

This application relates generally to automated anomaly detection, and more particularly, to anomaly detection in time-series.

BACKGROUND

Time-series data provides a sequence of data points for one or more variables collected at predetermined time intervals. In some time-series, the data points are collected as a sequence at successive equally spaced points in time, providing discrete-time data. In an ideal time-series, the data points fall within a static mean and static standard deviation, allowing for anomalous data points to be easily detected when falling outside of expected bounds.

Actual time-series data, such as that collected in conjunction with one or more real-world system operations, can include changing means and/or changing standard deviations. For example, the mean value and/or the variability of values can change within different time horizons. Anomaly detection systems and processes that expect a close-to-idealized time-series (i.e., a fixed mean and standard deviation) are not able to perform proper anomaly detection on time-series in which the mean and/or standard deviation are variable.

SUMMARY

In various embodiments, a system is disclosed. The system includes a non-transitory memory and a processor communicatively coupled to the non-transitory memory. The processor is configured to read a set of instructions to receive a time-series dataset and implement an iterative process to define a set of segments from the time-series dataset. The iterative process is configured to identify a set of changepoints in the time-series dataset based on a changepoint type and a sensitivity parameter, determine whether the set of segments defined by the changepoints satisfy at least one predetermined threshold criteria, modify the sensitivity parameter when the set of segments do not satisfy the at least one predetermined threshold criteria, and output the set of segments when the set of segments satisfy the at least one predetermined threshold criteria. A segment-specific anomaly detection threshold is determined for each segment in the set of segments and a set of anomaly-flagged segments is generated. The set of anomaly flagged segments are generated by an anomaly detection process based on the segment-specific anomaly detection threshold for a corresponding segment. The set of anomaly-flagged segments is combined to generate an anomaly-flagged time-series dataset.

In various embodiments, a computer-implemented method is disclosed. The method includes steps of receiving a time-series dataset and iteratively defining a set of segments from the time-series dataset by identifying a set of changepoints in the time-series dataset based on a changepoint type and a sensitivity parameter, determining whether the set of segments defined by the changepoints satisfy at least one predetermined threshold criteria, modifying the sensitivity parameter when the set of segments do not satisfy the at least one predetermined threshold criteria, and outputting the set of segments when the set of segments satisfy the at least one predetermined threshold criteria. The computer-implemented method further includes steps of determining a segment-specific anomaly detection threshold for each segment in the set of segments and generating a set of anomaly-flagged segments. The set of anomaly flagged segments are generated by an anomaly detection process based on the segment-specific anomaly detection threshold for a corresponding segment. The computer-implemented method further includes a step of combining the set of anomaly-flagged segments to generate an anomaly-flagged time-series dataset.

In various embodiments, a non-transitory computer-readable medium having instructions stored thereon is disclosed. The instructions, when executed by a processor, cause a device to perform operations comprising receiving a time-series dataset and iteratively defining a set of segments from the time-series dataset by identifying a set of changepoints in the time-series dataset based on a changepoint type and a sensitivity parameter, generating a first impact value for each segment in the set of segments defined by the changepoints, comparing the first impact value of a first segment in the set of segments with the first impact value of an immediately prior segment in the set of segments, determining whether the difference in the first impact value between the first segment and the immediately prior segment satisfies at least one predetermined threshold criteria, modifying the sensitivity parameter when the difference in the first impact value does not satisfy the at least one predetermined threshold criteria, and outputting the set of segments when the difference in the first impact value satisfies the at least one predetermined threshold criteria. The changepoint type is a mean, a variance, or a combination thereof. The instructions further cause the device to perform operations comprising calculating a second impact value for the time-series dataset, comparing the first impact value and the second impact value, generating a segment-specific anomaly detection threshold based on the comparison of the first impact value and the second impact value, generating a set of anomaly-flagged segments, and combining the set of anomaly-flagged segments to generate an anomaly-flagged time-series dataset. The set of anomaly flagged segments are generated by an anomaly detection process based on the segment-specific anomaly detection threshold for a corresponding segment.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
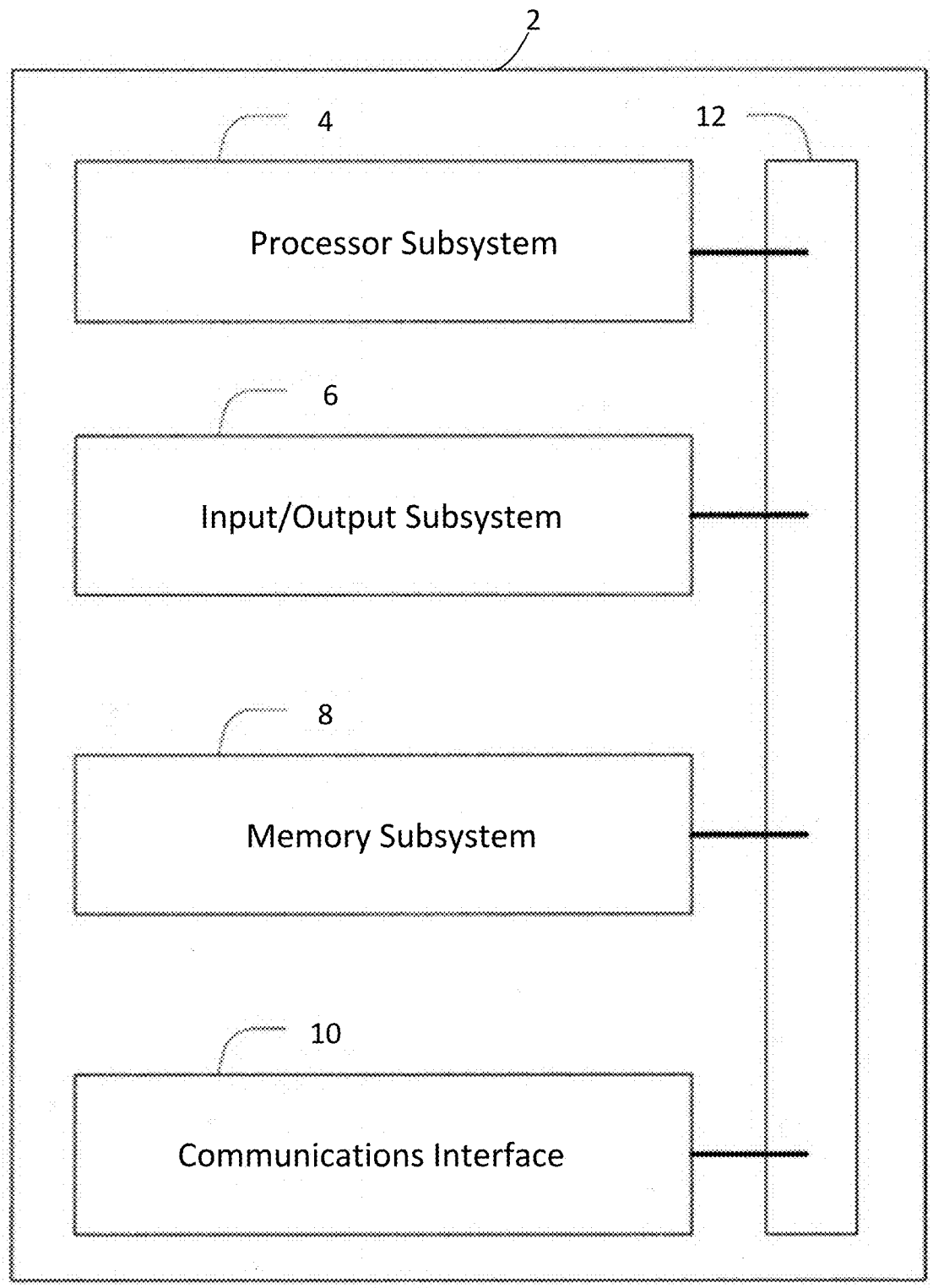
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for anomaly detection in time-series. In various embodiments, a time-series is received for anomaly detection. A changepoint detection process is applied automatically determine windows within the received time-series data for anomaly detection. The changepoint detection process can be configured to detect variations in one or more changepoints, such as, for example, a mean, a variance, and/or a combination of mean and variance. In some embodiments, a time-series segmentation process is applied to divide the time-series into time-series segments based on the identified windows and/or changepoints. For example, a dynamic sensitivity determination can be applied to identify segments within the time-series data. A dynamic threshold determination is applied to each generated time segment to identify thresholds for anomaly detection, such as thresholds related to distance from a mean value, number of standard deviations from a mean, etc. Anomaly detection is applied to each of the identified segments utilizing the dynamically determined thresholds. The detected anomalies within each segment are flagged and the segments are stitched together to generate a complete time-series with flagged anomalies.

In some embodiments, systems, and methods for anomaly detection in time-series includes one or more trained changepoint detection models, dynamic sensitivity models, dynamic threshold models, and/or segment-based anomaly detection models configured to detect events in univariate and/or multivariate time-series. The various trained models can include any suitable model frameworks. In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, neural networks which are trained (e.g., configured or adapted) to generate changepoint identifications, sensitivity outputs, threshold outputs, and/or anomaly detections, are disclosed. A neural network trained to generate changepoint identifications may be referred to as a trained changepoint detection model; a neural network trained to generate sensitivity outputs can be referred to as a trained sensitivity determination model; a neural network trained to generate threshold outputs can be referred to as trained threshold determination model, and a neural network trained to generate anomaly detections can be referred to as a trained anomaly detection model.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for end-to-end simulation including hybrid input modeling, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
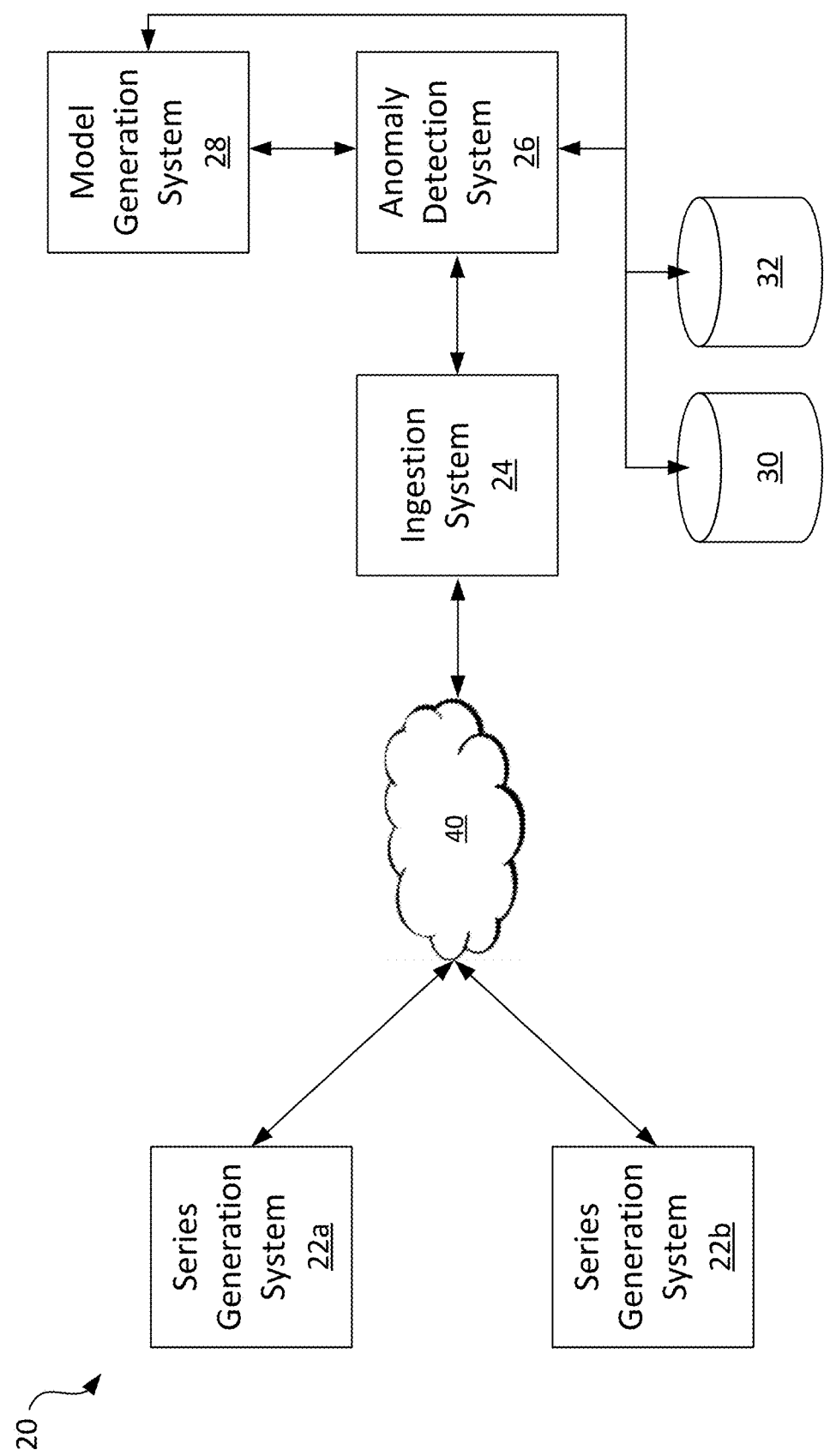
FIG. 2 illustrates a network environment configured to provide anomaly detection in time-series, in accordance with some embodiments.

FIG. 2 illustrates a network environment 20 configured to provide anomaly detection of time-series, in accordance with some embodiments. The network environment 20 includes a plurality of systems configured to communicate over one or more network channels, illustrated as network cloud 40. For example, in various embodiments, the network environment 20 can include, but is not limited to, one or more series generation systems 22a, 22b, an ingestion system 24, an anomaly detection system 26, a model generation system 28, a time-series database 30, and a model store database 32. It will be appreciated that any of the illustrated systems can include a system as described above in conjunction with FIG. 1. Although specific embodiments are discussed, herein it will be appreciated that additional systems, servers, storage mechanism, etc. can be included within the network environment 20.

Further, although embodiments are illustrated herein having individual, discrete systems, it will be appreciated that, in some embodiments, one or more systems can be combined into a single logical and/or physical system. For example, in various embodiments, one or more of the one or more series generation systems 22a, 22b, an ingestion system 24, an anomaly detection system 26, a model generation system 28, a time-series database 30, and a model store database 32 can be combined into a single logical and/or physical system. Similarly, although embodiments are illustrated having a single instance of each system, it will be appreciated that additional instances of a system can be implemented within the network environment 20. In some embodiments, two or more systems can be operated on shared hardware in which each system operates as a separate, discrete system utilizing the shared hardware, for example, according to one or more virtualization schemes.

In some embodiments, the one or more series generation systems 22a, 22b are configured to generate one or more time-series datasets. As discussed above, time-series datasets include sequences of data points for one or more variables collected at predetermined time intervals. The time-series dataset can be related to operation of one or more systems, such as one or more physical systems, one or more analog systems, one or more digital systems, one or more hybrid (e.g., mixed physical and digital/analog systems), etc. The time-series data can be generated according to any suitable process, such as, for example, through observations of one or more elements of a system, ingestion of data generated by one or more systems, analysis of one or more systems, etc.

In some embodiments, the one or more series generation systems 22a, 22b are operate the underlying monitored system generating the time-series data. For example, in some embodiments, a series generation system 22a, 22b are configured to implement one or more digital and/or hybrid systems that generate time-series datasets, such as time-series outputs, metrics, etc. during operation. As another example, in some embodiments, a series generation system 22a, 22b is configured to control a physical and/or hybrid system that generates time-series datasets, such as outputs, metrics, measurements, etc. It will be appreciated that the time-series datasets can be generated utilizing any suitable process.

In some embodiments, the time-series datasets are provided to an ingestion system 24. The ingestion system 24 is configured to receive time-series datasets from one or more sources, such as from the one or more series generation systems 22a, 22b. The ingestion system 24 can be configured to store the received time-series datasets in one or more database, such as the time-series database 30. In some embodiments, the ingestion system 24 is configured to receive a stream (e.g., pipeline) of time-series data and generate stored time-series datasets for use by additional systems or processes, as discussed herein.

In some embodiments, an anomaly detection system 26 is configured to perform anomaly detection on one or more of the time-series datasets received by the ingestion system 24. The anomaly detection system 26 is configured to apply time-series anomaly detection for univariate and/or multivariate time-series according to the systems and methods disclosed herein. In some embodiments, the anomaly detection system 26 is configured to implement a changepoint detection engine, a segmentation engine, a threshold determination engine, and an anomaly detection engine.

The changepoint detection engine is configured to identify changepoints, e.g., changes in mean and/or variance (e.g., standard deviation) in a time-series dataset. The changepoint determination engine provides the determined changepoints to the segmentation engine, which generates dynamic sensitivity determinations for generating time-series segments from the time-series dataset. The time-series segments are provided to a threshold determination engine configured to generate thresholds for use in an anomaly detection process.

The segmented time-series with selected thresholds are provided to an anomaly detection engine configured to implement one or more anomaly detection processes for detecting anomalies in time-series data. In some embodiments, the anomaly detection engine is configured to flag each detected anomaly. In some embodiments, the anomaly detection system 26 is configured to stitch (e.g., combine) each of the segmented time-series to generate a complete time-series corresponding to the time-series dataset and including flagged anomalies.

In some embodiments, one or more of the changepoint detection engine, the segmentation engine, the threshold determination engine, and/or the anomaly detection engine are configured to implement a trained machine learning model. For example, in some embodiments, the changepoint detection engine is configured to implement a changepoint detection model having a trained framework configured for changepoint detection. The trained framework can include a trained supervised learning framework and/or a trained unsupervised learning framework. For example, in various embodiments, a changepoint detection mode can include a pruned exact linear time (PELT) framework, a changepoint for a range of penalties (CROPS) framework, a combination PELT and CROPS framework, a sequentially discounted autoregressive (SDAR) framework, a binary segmentation framework, a kernel change detection framework, and/or any other suitable framework. As another example, in some embodiments, the segmentation engine is configured to implement a segmentation model having a trained framework configured to determine sensitivity values for segmentation of a time-series dataset based on the changepoints identified by the changepoint detection engine, for example, by applying an iterative process to compare metrics corresponding to one or more segments and adjusting for sensitivity of segment detection. As yet another example, in some embodiments, the threshold determination engine is configured to implement a threshold determination model having a trained framework configured to determine thresholds for each segment identified by the segmentation engine, for example, to apply one or more statistical processes and/or comparisons. As still another example, in some embodiments, the anomaly detection engine is configured to implement an anomaly detection model having a trained framework configured to anomaly detection, such as, for example, a standard deviation framework.

In some embodiments, trained models can be generated by a model generation system 28. The model generation system 28 is configured to generate one or more trained models using, for example, iterative training processes. For example, in some embodiments, a model training engine is configured to generate one or more of a trained changepoint detection model, a trained segmentation model, a trained threshold determination model, and/or a trained anomaly detection model. In some embodiments, the model training system is configured to receive training data including labelled and/or unlabeled time-series datasets and generate one or more trained models. Generated models can be stored in any suitable storage mechanism, such as, for example, the model store database 32.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
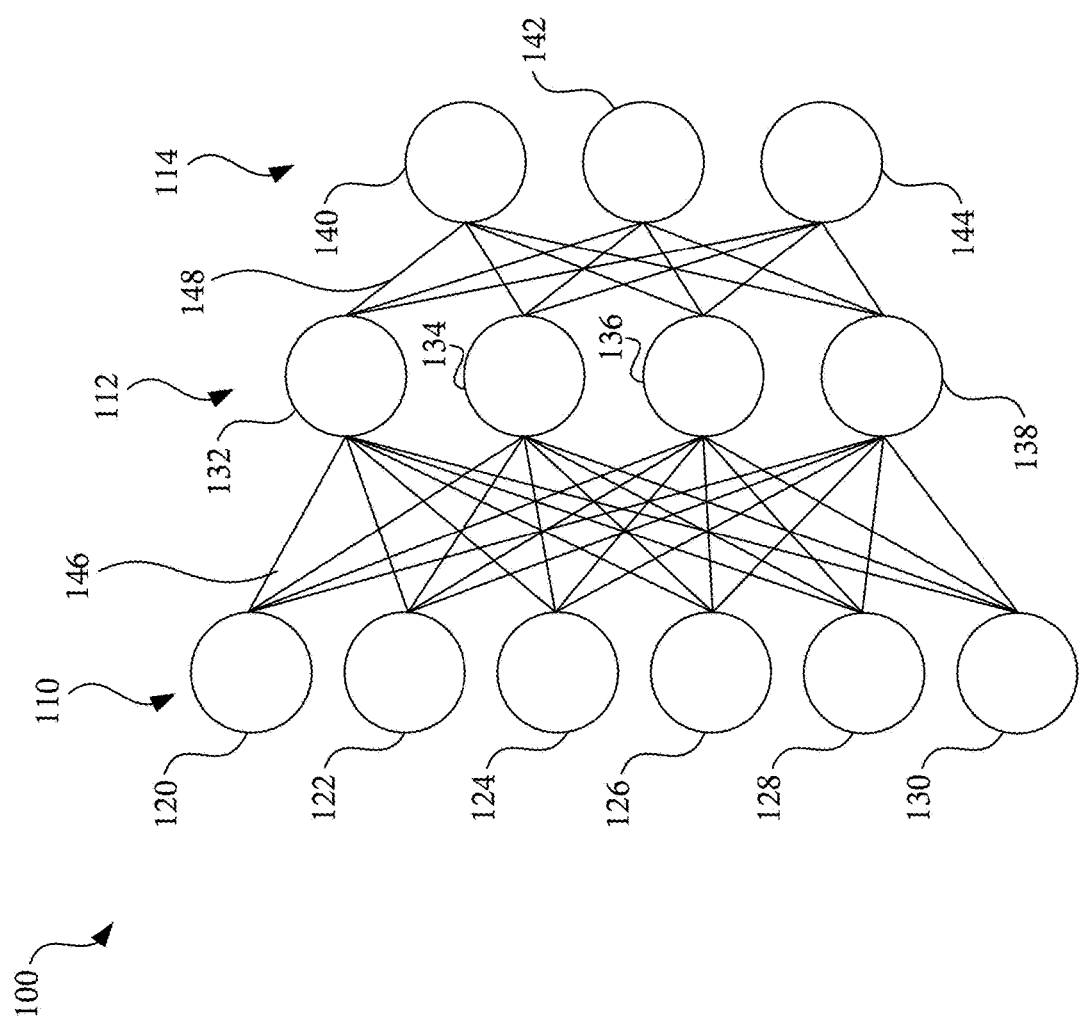
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval [−1, 1], within the interval [0, 1], and/or within any other suitable interval. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(n,n+1)}$.

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein γ is a learning rate, and the numbers $\delta_j^{(n)}$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta_j^{(n+1)}$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $y_j^{(n+1)}$ is the comparison training value for the j-th node of the output layer 114.

Figure 4:
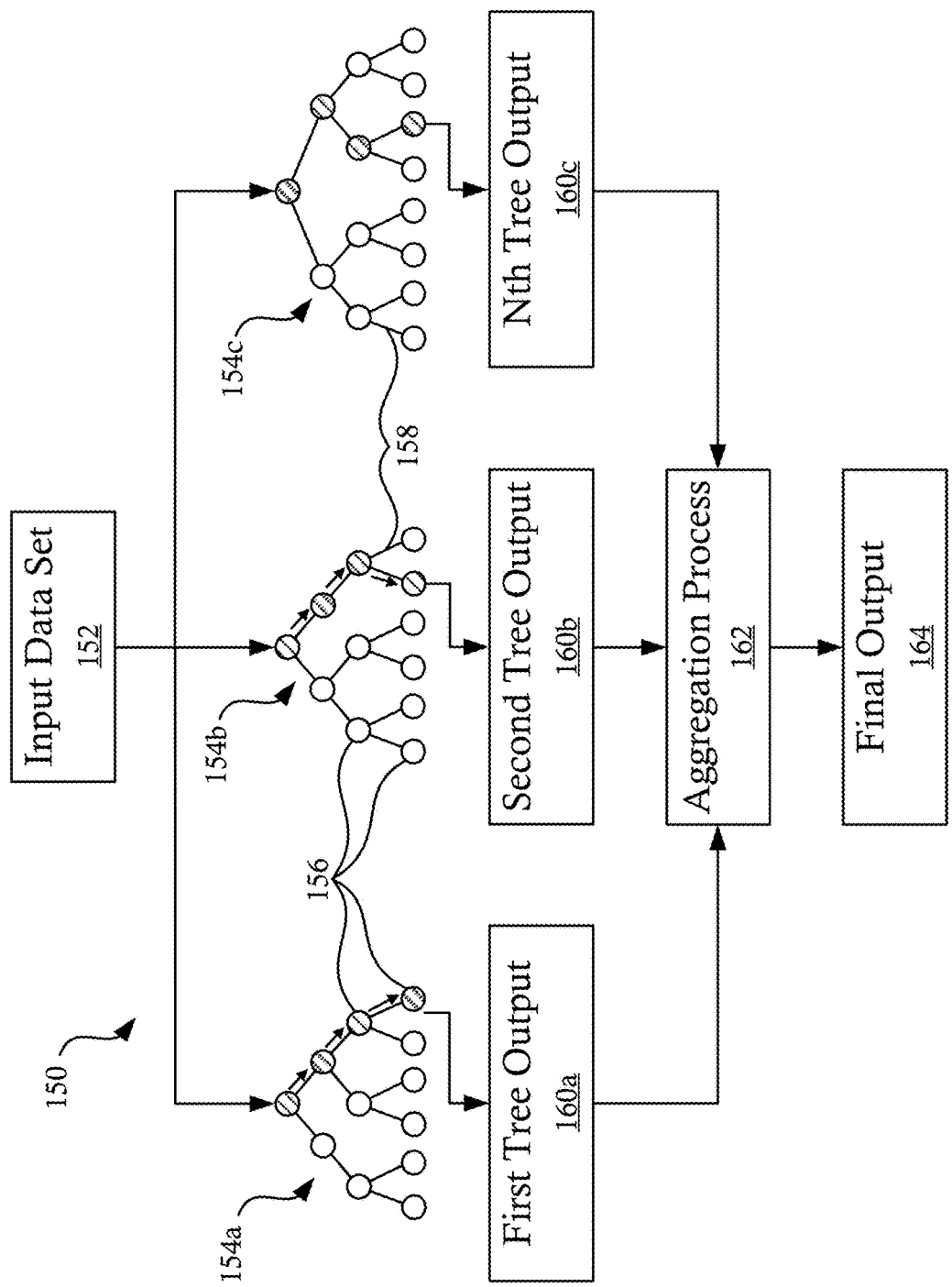
FIG. 4 illustrates a tree-based artificial neural network, in accordance with some embodiments.

FIG. 4 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154a-154c each including a set of nodes 156 (also referred to as "leaves") and a set of edges 158 (also referred to as "branches").

Each of the trained decision trees 154a-154c can include a classification and/or a regression tree (CART). Classification trees include a tree model in which a target variable can take a discrete set of values, e.g., can be classified as one of a set of values. In classification trees, each leaf 156 represents class labels and each of the branches 158 represents conjunctions of features that connect the class labels. Regression trees include a tree model in which the target variable can take continuous values (e.g., a real number value).

In operation, an input data set 152 including one or more features or attributes is received. A subset of the input data set 152 is provided to each of the trained decision trees 154a-154c. The subset can include a portion of and/or all of the features or attributes included in the input data set 152. Each of the trained decision trees 154a-154c is trained to receive the subset of the input data set 152 and generate a tree output value 160a-160c, such as a classification or regression output. The individual tree output value 160a-160c is determined by traversing the trained decision trees 154a-154c to arrive at a final leaf (or node) 156.

In some embodiments, the tree-based neural network 150 applies an aggregation process 162 to combine the output of each of the trained decision trees 154a-154c into a final output 164. For example, in embodiments including classification trees, the tree-based neural network 150 can apply a majority-voting process to identify a classification selected by the majority of the trained decision trees 154a-154c. As another example, in embodiments including regression trees, the tree-based neural network 150 can apply an average, mean, and/or other mathematical process to generate a composite output of the trained decision trees. The final output 164 is provided as an output of the tree-based neural network 150.

Figure 5:
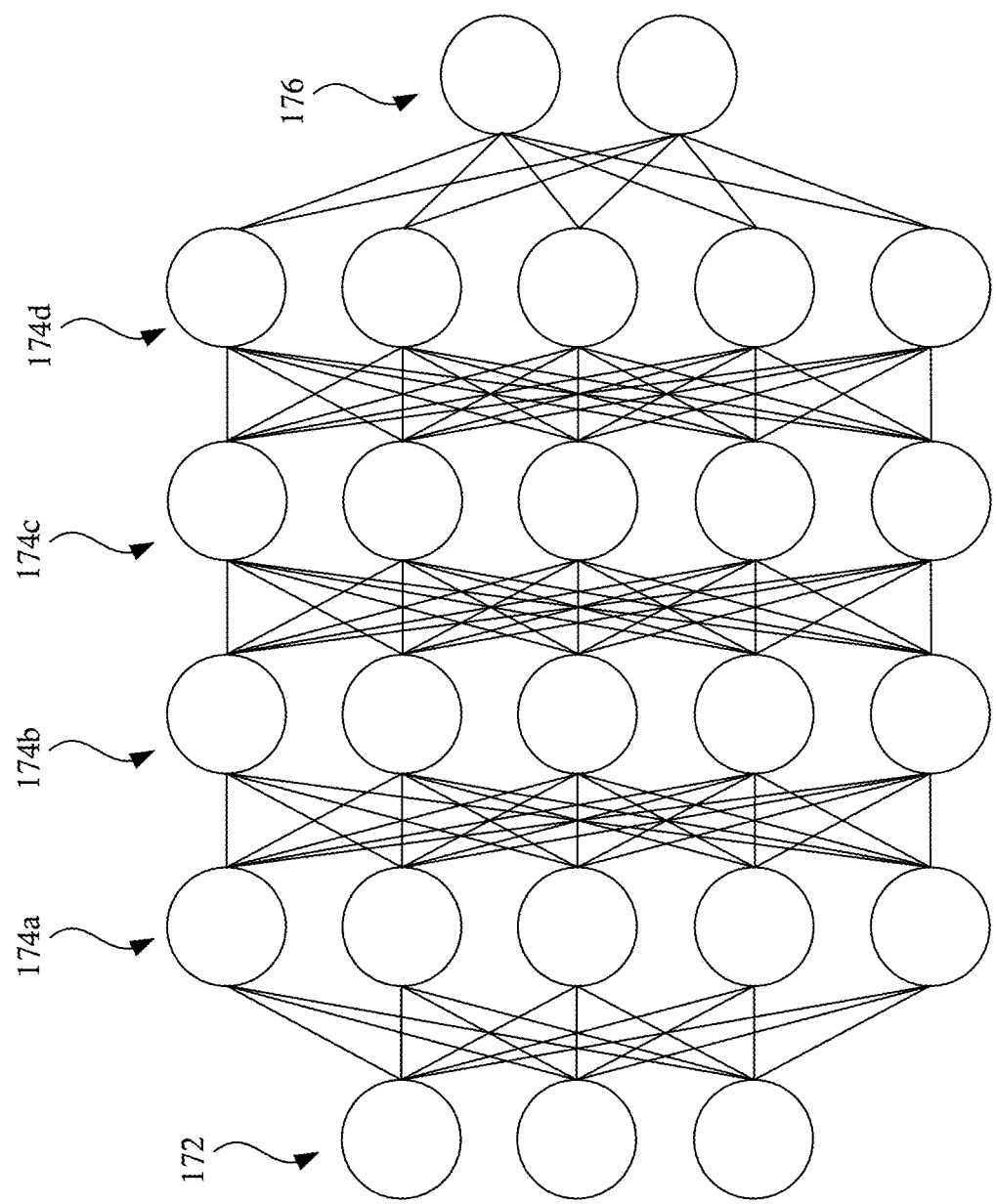
FIG. 5 illustrates a deep neural network (DNN), in accordance with some embodiments.

FIG. 5 illustrates a deep neural network (DNN) 170, in accordance with some embodiments. The DNN 170 is an artificial neural network, such as the neural network 100 illustrated in conjunction with FIG. 3, that includes representation learning. The DNN 170 can include an unbounded number of (e.g., two or more) intermediate layers 174a-174d each of a bounded size (e.g., having a predetermined number of nodes), providing for practical application and optimized implementation of a universal classifier. Each of the layers 174a-174d can be heterogenous. The DNN 170 can is configured to model complex, non-linear relationships. Intermediate layers, such as intermediate layer 174c, can provide compositions of features from lower layers, such as layers 174a, 174b, providing for modeling of complex data.

In some embodiments, the DNN 170 can be considered a stacked neural network including multiple layers each configured to execute one or more computations. The computation for a network with L hidden layers can be denoted as:

$$f(x) = f\left[a^{(L+1)}\left(h^{(L)}\left(a^{(L)}\left(...\left(h^{(2)}\left(a^{(2)}\left(h^{(1)}\left(a^{(1)}(s)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ can include a linear operation with matrix $W^{(l)}$ and bias $b^{(l)}$, where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 can include a backpropagation network in which the output of at least one hidden layer is provided, e.g., propagated, to a prior hidden layer. The DNN 170 can include any suitable neural network, such as a self-organizing neural network, a recurrent neural network, a convolutional neural network, a modular neural network, and/or any other suitable neural network.

In some embodiments, a DNN 170 can include a neural additive model (NAM). An NAM includes a linear combination of networks, each of which attends to (e.g., provides a calculation regarding) a single input feature. For example, an NAM can be represented as:

$$y = \beta + f_1(x_1) + f_2(x_2) + \cdots + f_K(x_K)$$

where $\beta$ is an offset and each $f_i$ is parametrized by a neural network. In some embodiments, the DNN 170 can include a neural multiplicative model (NMM), including a multiplicative form for the NAM mode using a log transformation of the dependent variable y and the independent variable x:

$$y = e^{\beta} e^{f(\log x)} e^{\Sigma_i f_i^d(d_i)}$$

where d represents one or more features of the independent variable x.

Figure 6:
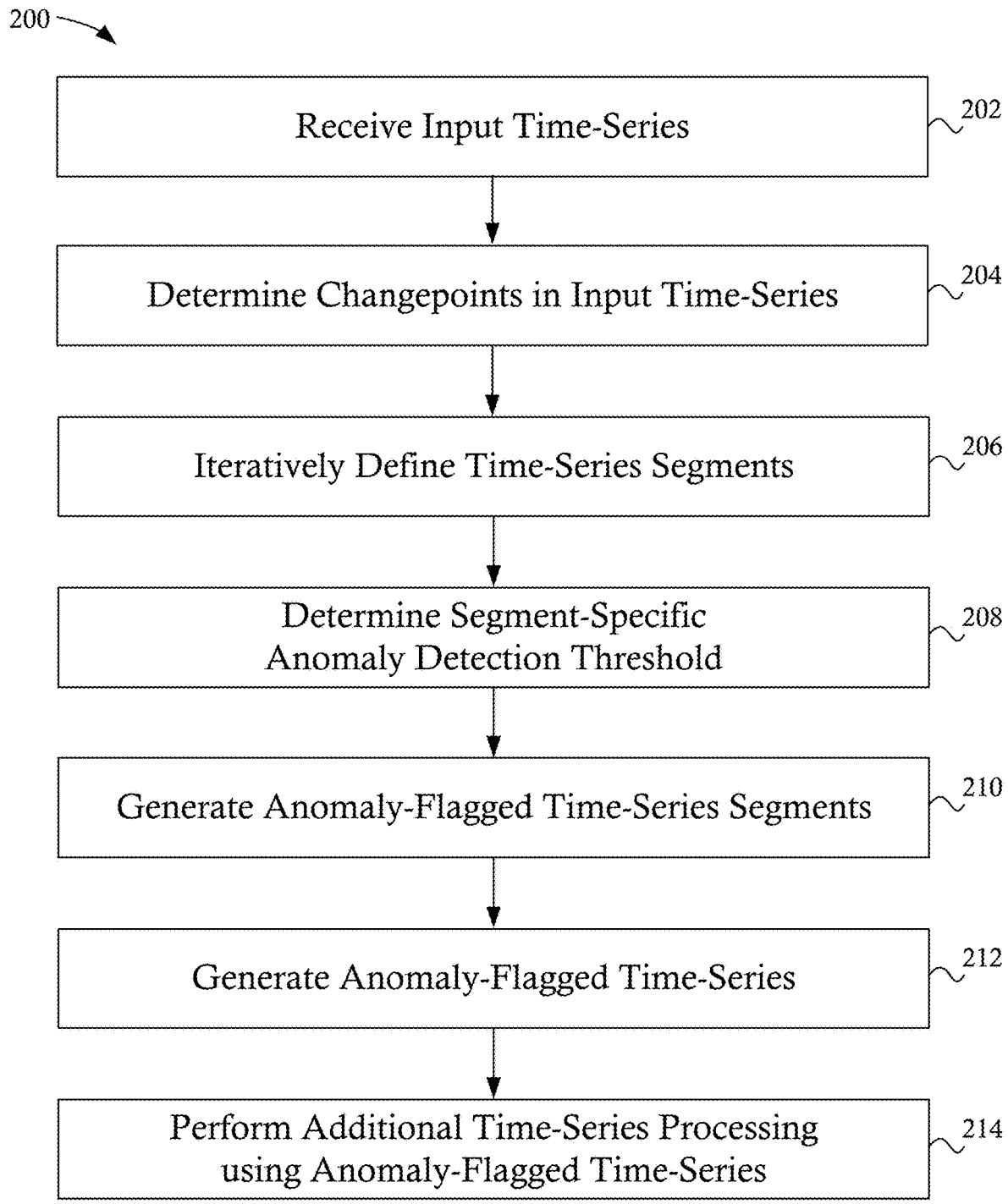
FIG. 6 is a flowchart illustrating a method of anomaly detection in time-series, in accordance with some embodiments.
Figure 7:
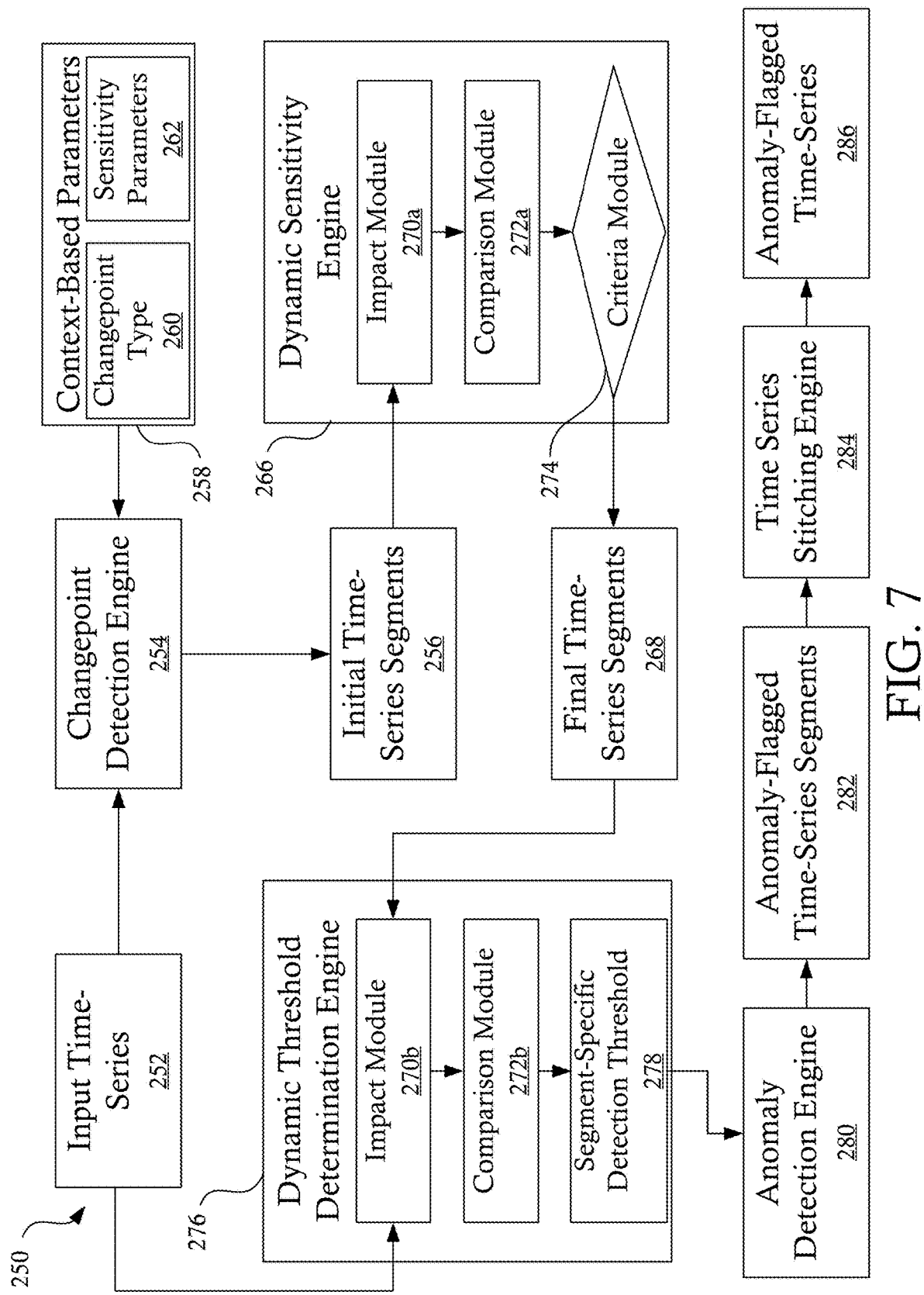
FIG. 7 is a process flow illustrating various steps of the method of anomaly detection in time-series, in accordance with some embodiments.

FIG. 6 is a flowchart illustrating a method 200 of anomaly detection in time-series, in accordance with some embodiments. FIG. 7 is a process flow 250 illustrating various steps of the method 200 of anomaly detection in time-series, in accordance with some embodiments. At step 202, an input time-series 252 is received. The input time-series 252 can include any suitable input time-series, such as a univariate input time-series generated by one or more series generation systems 22a, 22b, obtained from a storage element, such as a time-series database 30, and/or otherwise received by a system configured to perform anomaly detection of time-series. The received input time-series 252 can include one or more changepoints, such as, for example, a mean change and/or a variance change.

At step 204, one or more changepoints in the received input time-series 252 are determined. For example, in some embodiments, a changepoint detection engine 254 is configured to receive the input time-series 252 and a set of context-based parameters 258 and identify the one or more changepoints based on the context-based parameters 258. The changepoint detection engine 254 can be configured to implement one or more models and/or algorithms, such as, for example, a trained changepoint detection model.

In some embodiments, the set of context-based parameters 258 includes one or more changepoint type parameters 260 and/or sensitivity parameters 262. For example, the set of context-based parameters 258 can include one or more changepoint type parameters 260 defining one or more changepoint types, such as a mean, a variance, a mean and a variance, etc. In some embodiments, a sensitivity parameter 262 can be configured to differentiate between changepoint and non-changepoint variations within the input time-series 252. For example, in some embodiments, one or more sensitivity parameters 262 can define a minimum change in a variable, e.g., mean, variance, etc., necessary for the change to be considered a changepoint. The minimum change can be defined as an absolute value, a percentage value, a standard deviation value, and/or any other suitable value. In some embodiments, a sensitivity parameter 262 can be defined for each defined changepoint type parameter 260 and/or can include a universal sensitivity parameter. An initial value of the sensitivity parameter 262 can be assigned randomly and/or based on prior operation of a system configured to implement the method 200.

In some embodiments, the changepoint detection engine 254 is configured to utilize one or more trained changepoint detection models to identify one or more changepoints. For example, the changepoint detection engine 254 can be configured to implement one or more of a trained PELT model, a trained CROPS model, and/or any other suitable trained model. The trained changepoint detection models can be configured to apply the sensitivity parameters for a corresponding set of changepoint types, such as, for example, a mean and/or a variance. In some embodiments, a first model framework can be configured to determine changepoints of a first changepoint type and a second model framework can be configured to determine changepoints of a second changepoint type.

In some embodiments, the changepoint detection engine 254 is configured to segment the input time-series 252 into a set of initial time-series segments 264. The set of initial time-series segments 264 include portions of the input time-series 252 that incorporate data points beginning a first changepoint and extending through a second changepoint. The set of initial time-series segments 264 can include segments defined based on a first changepoint type, a second changepoint type, a combination thereof, etc. The set of initial time-series segments 264 can include any number of variable length segments generated from the input time-series 252.

At step 206, the set of initial time-series segments 264 are dynamically and iteratively refined to generate a set of final time-series segments 268. For example, and as described in more detail below, in some embodiments, a dynamic sensitivity engine 266 is configured to generate one or more updated sensitivity parameters 262 based on an impact determination for the set of initial time-series segments 264. The updated sensitivity parameters 262 are provided to the changepoint detection engine 254, which generates a new set of detected changepoints and corresponding set of initial time-series segments 264. The dynamic sensitivity engine 266 and the changepoint detection engine 254 iteratively update the sensitivity parameter 262 and generate new sets of initial time-series segments 264 until a predetermined criteria is met. When a set of initial time-series segments 264 meets the predetermined criteria, the set of initial time-series segments 264 are output as a set of final time-series segments 268.

In some embodiments, the dynamic sensitivity engine 266 includes a segment impact module 270a configured to generate an impact value for each segment in the set of initial time-series segments 264. An impact value is representative of the effect, or impact, that a time-series dataset, such as an input time-series 252 and/or a selected one of the set of initial time-series segments 256, would have in the context of one or more target processes utilizing the time-series data as an input. For example, in the context of an e-commerce time-series dataset, the impact value can be representative of an impact of a selected time-series segment on one or more key performance indicators (e.g., KPIs). The time-series impact value can be based on quantitative and/or qualitive measures. The segment impact module 270a can be configured to implement a set of impact calculation logic to generate the impact values. Although certain embodiments are discussed herein, it will be appreciated that the impact value can be determined based on any suitable target application of the input time-series dataset.

In some embodiments, the dynamic sensitivity engine 266 includes a comparison module 272a configured to compare the impact for each segment with a next segment in the set of initial time-series segments 264 to determine if the difference between the compared segments is significant (i.e., if the identified changepoint between the two segments represents an actual changepoint or a non-changepoint value (e.g., an anomalous value, a non-anomalous non-changepoint value, etc.)). In some embodiments, a significant difference between segments is identified based on one or more predetermined threshold criteria. When a difference between segments is not significant, e.g., the predetermined threshold criteria is not met, the dynamic sensitivity engine 266 adjusts one or more sensitivity parameters 262 such that the identified changepoint between the two segments will not be identified as a changepoint during a subsequent changepoint detection iteration.

In some embodiments, the dynamic sensitivity engine 266 is configured to iteratively adjust one or more sensitivity parameters 262 until one or more threshold criteria are met. The one or more threshold criteria can include threshold criteria related to individual segments and/or overall threshold criteria related to the set of initial time-series segments 264 as whole. For example, individual threshold criteria can include, but are not limited to, impact value differences for adjacent segments, segment length, variance or mean within a segment, etc. As another example, overall threshold criteria can include, but are not limited to, number of segments in the set of initial time-series segments 264, predetermined sensitivity or changepoint requirements, etc.

In some embodiments, the dynamic sensitivity engine 266 is configured to implement one or more trained dynamic sensitivity models. For example, the dynamic sensitivity engine 266 can include one or more trained models configured to determine an impact of each segment, determine a difference in impact between adjacent segments, determine if the threshold criteria are met, and/or generate updated sensitivity values based on the impact of each segment and/or the difference in impact between adjacent segments. It will be appreciated that a trained dynamic sensitivity model can include any suitable framework, such as, for example, a framework configured to apply statistical data processing.

At step 208, a segment-specific anomaly detection threshold 278 is determined for each segment in the set of final time-series segments 268. For example, in some embodiments, a dynamic threshold determination engine 276 is configured to receive the input time-series 252 and each of the segments in the set of final time-series segments 268 and generate a segment-specific anomaly detection threshold 278 for each segment in the set of final time-series segments 268. The dynamic threshold determination engine 276 is configured to provide the segment-specific anomaly detection threshold 278 and each corresponding segment to an anomaly detection engine 280, as discussed in greater detail below.

In some embodiments, the dynamic threshold determination engine 276 is configured to determine a segment-specific anomaly detection threshold 278 based on an impact of an individual segment within the input time-series 252. For example, in some embodiments, the dynamic threshold determination engine 276 is configured to an impact module 270b to determine one or more impact values related a selected time-series segment. In some embodiments, the impact module 270b can be configured to generate an overall series impact value and a segment impact value. In some embodiments, one or more impact scores, such as a segment impact score, can be received by the dynamic threshold determination engine 276 from one or more other engines. For example, in some embodiments, a segment impact score calculated by the dynamic sensitivity engine 266 can be included in the set of final time-series segments 268 and utilized by the dynamic threshold determination engine 276 without needing to recalculate the segment impact score. In some embodiments, the dynamic threshold determination engine 276 includes a comparator 272b configured to compare an impact value for each segment in the set of final time-series segments 268 with an overall series impact value.

The dynamic threshold determination engine 276 is configured to generate an anomaly detection threshold 278 for each segment. In some embodiments, the anomaly detection threshold 278 is determined as a function of the impact comparison, i.e., as a function of the difference between the overall series impact and the segment impact. Although specific embodiments are discussed herein, it will be appreciated that any suitable method or process can be applied to determine an anomaly detection threshold 278 for each segment in the set of final time-series segments 268.

In some embodiments, the dynamic threshold determination engine 276 is configured to implement one or more trained dynamic threshold determination models. For example, the dynamic threshold determination engine 276 can include one or more trained models configured to determine one or more impacts of each segment (e.g., overall series impact, segment impact, etc.), determine a difference in impact values, and/or generate segment-specific anomaly detection thresholds 278 based on the difference in impacts. It will be appreciated that a trained dynamic sensitivity model can include any suitable framework, such as, for example, a framework configured to apply statistical data processing.

At step 210, segment-specific anomaly detection is performed on each segment in the set of final time-series segments 268 based on the corresponding segment-specific anomaly detection threshold 278. For example, in some embodiments, an anomaly detection engine 280 is configured to receive a segment-specific anomaly detection threshold 278 and a corresponding one of the set of final time-series segments 268 and implement one or more anomaly detection processes. In some embodiments, the anomaly detection engine 280 is configured to implement one or more trained anomaly detection models, such as, for example, a trained anomaly detection model having a standard deviation-based detection framework. Although specific embodiments are discussed herein, it will be appreciated that any suitable anomaly detection process can be utilized to determine segment-specific anomalies based on the segment-specific anomaly detection threshold 278.

In some embodiments, the anomaly detection engine 280 generates a set of anomaly-flagged time-series segments 282. It will be appreciated that a given time-series segment can include no flagged anomalies (e.g., none of the data points within a given time-series segment were identified as anomalous by the anomaly detection engine 280 based on the segment-specific anomaly detection threshold 278) or can include one or more flagged anomalies (e.g., one or more of the data points within a given time-series segment were identified as anomalous by the anomaly detection engine 280 based on the segment-specific anomaly detection threshold 278).

At step 212, the set of anomaly-flagged time-series segments 282 are stitched together, e.g., re-combined, to generate an anomaly-flagged time-series 286. For example, in some embodiments, a time series stitching engine 284 is configured to sequentially combine each of the segments in the set of anomaly-flagged time-series segments 282 in time order to generate the anomaly-flagged time-series 286. The anomaly-flagged time-series 286 includes the same time-series datapoints as included in the input time-series 252 and further includes one or more flagged anomalies identified therein. The flagged anomalies include local anomalous values such that a value identified as anomalous in a first portion of the anomaly-flagged time-series 286 may not be identified as anomalous in a second portion of the anomaly-flagged time-series 286.

Figure 8:
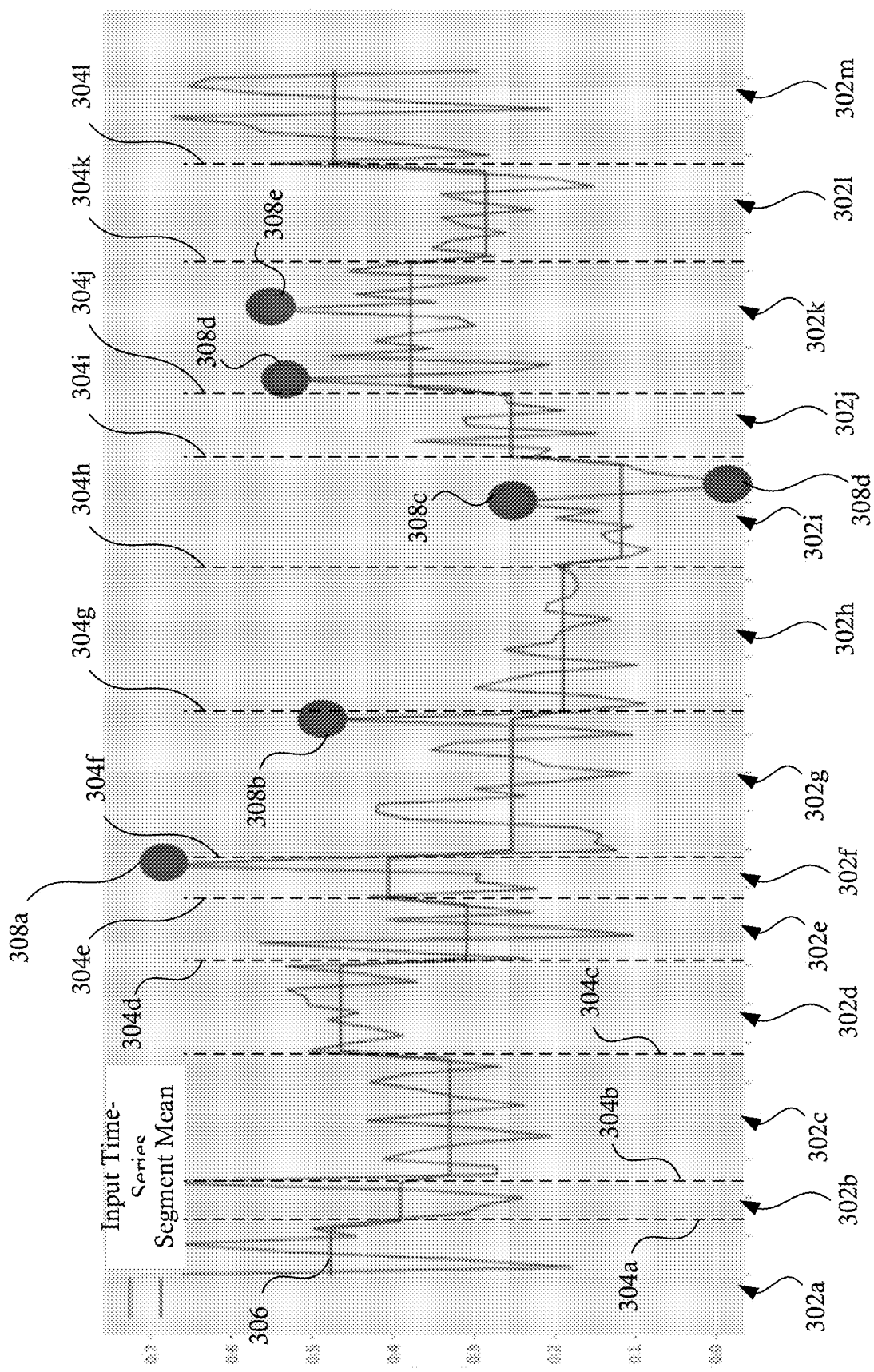
FIG. 8 illustrates a time-series dataset having a plurality of anomalies identified according to the systems and methods disclosed herein, in accordance with some embodiments.

FIG. 8 illustrates a time-series dataset 300 having a plurality of anomalies identified based on the method 200 discussed above. The time-series dataset 300 includes a plurality of segments 302a-302m corresponding to a plurality of intermediate changepoints 304a-304l. The changepoints 304a-304l and corresponding segments 302a-302m represent a set of final time-series segments defined by an iterative sensitivity adjustment process, as discussed above with respect to steps 204-206 of FIG. 6. In the illustrated embodiment, the changepoints 304a-304l correspond to mean value changepoints, although it will be appreciated that a time-series dataset divided by additional or alternative changepoints, such as a variance changepoint, would be similar. As will be appreciated, the segments 302a-302m have variable lengths based on the distance between changepoints in the underlying time-series dataset.

A mean value line 306 represents a mean value for each segment with respect to the underlying datapoints of the represented time-series dataset 300. As illustrated in FIG. 8, the mean value can increase or decrease between adjacent segments. For example, the transition from the first segment 302a to the second segment 302b illustrates a transition during which the mean value decreases. Similarly, the transition from the third segment 302c to the fourth segment 302d illustrates a transition during which the mean value increases.

In some embodiments, the change in mean value represents one or more global trends with respect to the time-series dataset 300. For example, from the sixth segment 302f to the ninth segment 302i, the mean value decreases at each changepoint 304f-304h, indicating that the time-series represented by the time-series dataset 300, e.g., a metric or other time-series value, is trending in a downward or decreasing direction for those segments. Similarly, from the ninth segment 302i to the eleventh segment 302k, the mean value increases at each changepoint 304i, 304j, indicating that the time-series is trending in an upward or increasing direction for those segments.

As illustrated in FIG. 8, a plurality of anomalies 308a-308e are flagged, e.g., identified, within various segments 302f, 302g, 302i, 302k. Each of the anomalies 308a-308e represents a data point having a value outside of a predetermined, segment-specific threshold. As will be appreciated by one of skill in the art, one or more of the identified anomalies 308a-308e would not be identified an anomalous values if anomaly detection was applied to the entirety of the time-series dataset 300. For example, the first anomaly 308a illustrates an anomalous value with respect to the second segment sixth segment 302f but has a value similar to that of certain data points within the first segment 302a, the second segment 302b, and the thirteenth segment 302m and therefore may not be identified as an anomalous value if anomaly detection were applied to the time-series dataset 300 as a whole. Each of the other identified anomalies 302b-302e may not be identified as anomalous values if the time-series dataset 300 is considered as a whole. Similarly, certain values not identified as anomalous values may be flagged as anomalous if anomaly detection is applied to the time-series dataset 300 as a whole.

The disclosed systems and methods utilize segment-specific threshold values to perform segment-specific anomaly detection, providing higher precision and accuracy for anomaly detection within each of the defined segments 302a-302m, as compared to current global anomaly detection methods. For example, the disclosed changepoint detection engine and corresponding processes allows for automated segment (e.g., window) determination for application of anomaly detection. Identification of a set of time-series segments allows for the application of segment-specific configurations during anomaly detection. Similarly, the dynamic selection of changepoint sensitivities based on individual segment context or impact, for example as applied by the disclosed dynamic sensitivity detection engine and corresponding processes, and/or the dynamic threshold determination based on segment and/or overall impact, for example as applied by the disclosed dynamic threshold determination engine and corresponding processes, allows for higher accuracy and precision in identifying anomalies within a specific segment.

With reference again to FIG. 6, at optional step 214, the anomaly-flagged time-series 290 can be utilized for any additional time-series processing. For example, in various embodiments, the anomaly-flagged time-series 290 can be provided as an input to one or more additional processes, such as a prediction process, an ingestion process, a monitoring process, an evaluation process, etc. The anomaly-flagged time-series 290 can be processed to remove flagged anomalies, evaluated to determine the cause of flagged anomalies, and/or utilized for additional processing with the flagged anomalies included in the time-series dataset.

It will be appreciated that systems and methods for performing segment-specific anomaly detection as disclosed herein, particularly on large datasets intended to be used with large time-series data inputs or large scale systems, is only possible with the aid of computer-assisted algorithms and techniques, such as the disclosed method 200. In some embodiments, processes including implementation of method 200 are used to perform operations that cannot practically be performed by a human, either mentally or with assistance, such as iterative segmentation of time-series data and segment-specific anomaly detection. It will be appreciated that a variety of machine learning techniques can be used alone or in combination to implement the disclosed methods.

Figure 9:
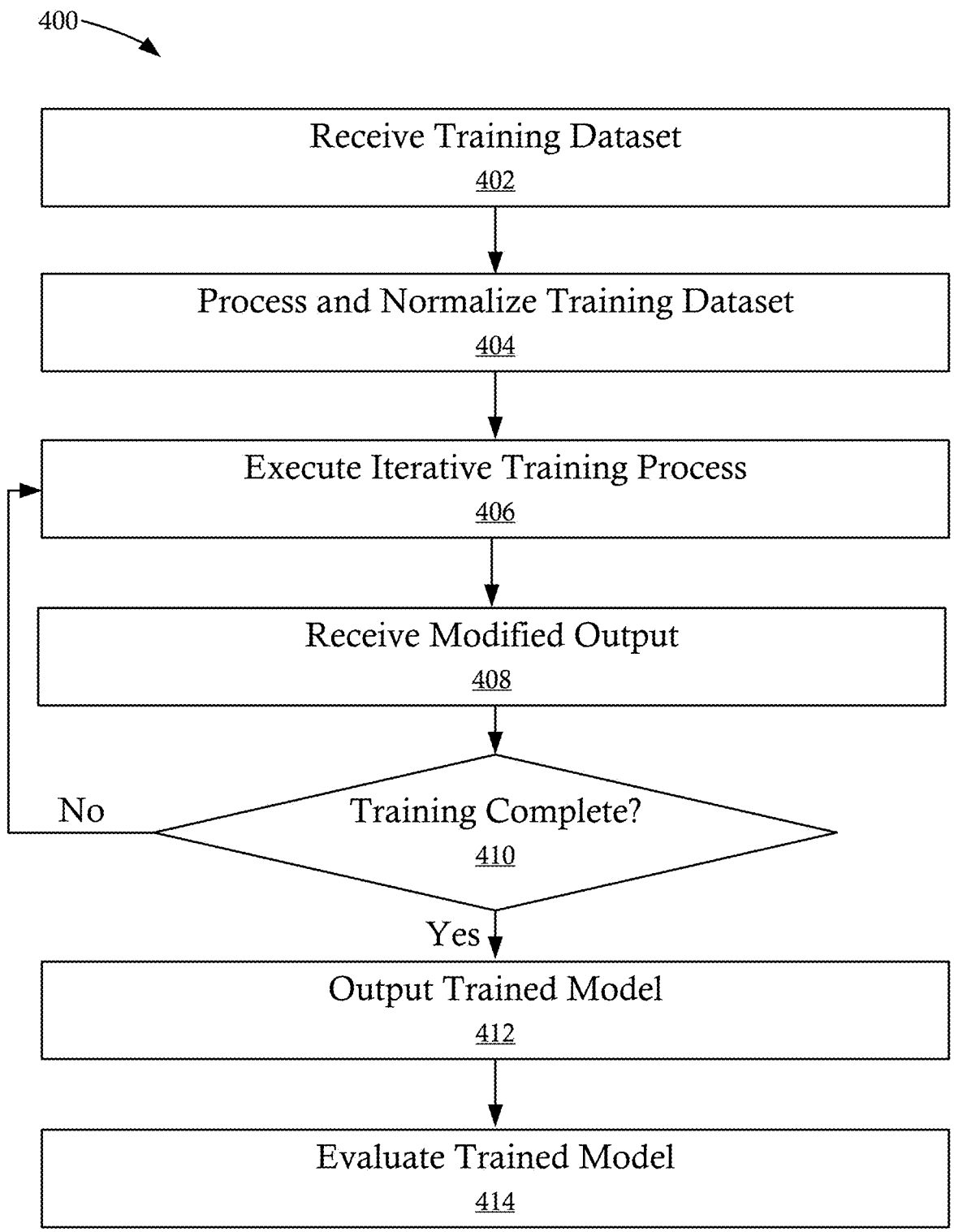
FIG. 9 is a flowchart illustrating a training method for generating a trained machine learning model, in accordance with some embodiments.
Figure 10:
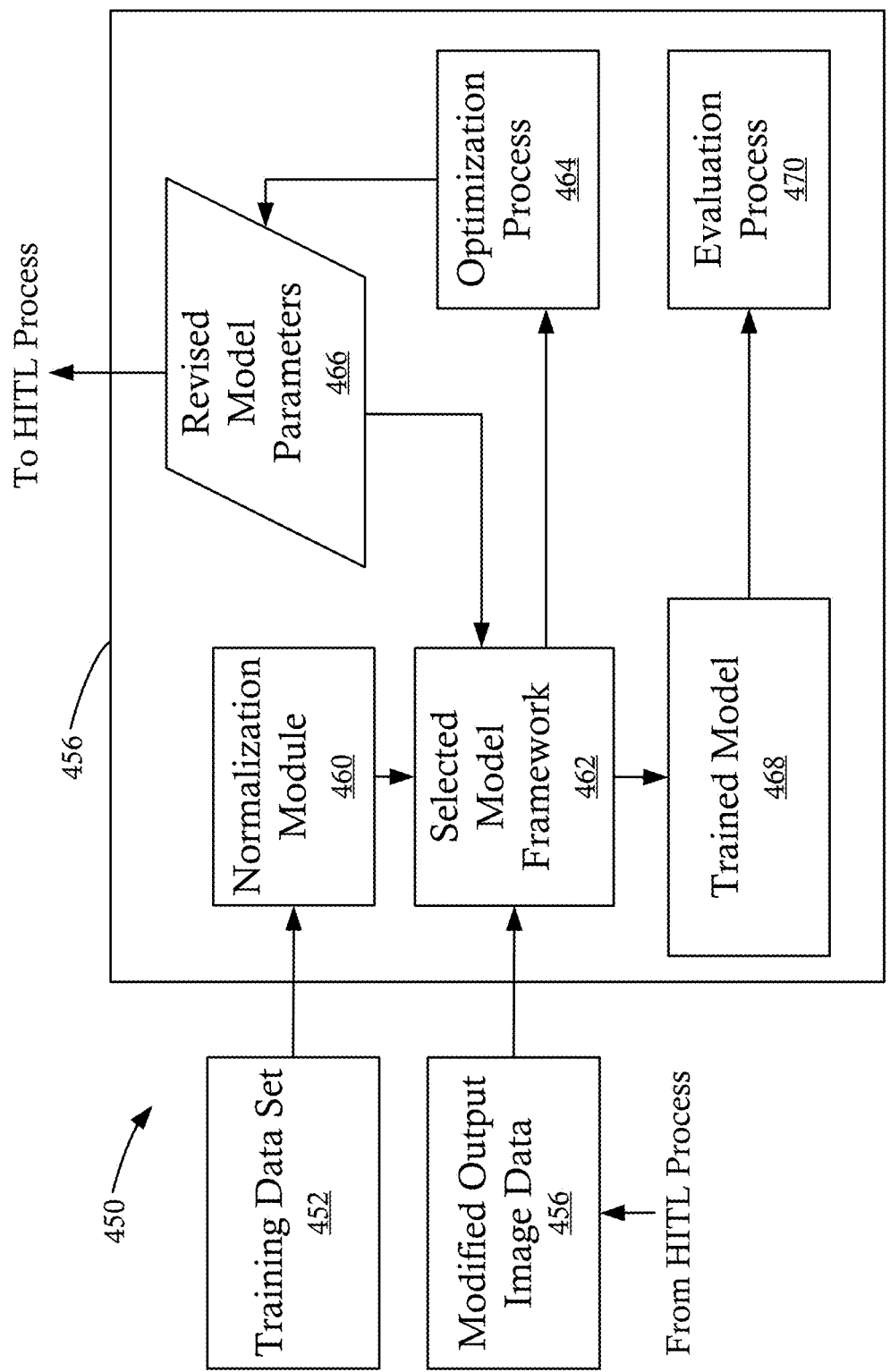
FIG. 10 is a process flow illustrating various steps of the training method of FIG. 9, in accordance with some embodiments.

In some embodiments, a changepoint detection engine, a dynamic sensitivity detection engine, and/or the dynamic threshold determination engine can include and/or implement one or more trained models, such as a trained changepoint detection models, trained detection models, and/or trained determination models. In some embodiments, one or more trained models can be generated using an iterative training process based on a training dataset. FIG. 9 illustrates a method 400 for generating a trained model, such as a trained optimization model, in accordance with some embodiments. FIG. 10 is a process flow 450 illustrating various steps of the method 400 of generating a trained model, in accordance with some embodiments. At step 402, a training dataset 452 is received by a system, such as a processing device. The training dataset 452 can include labeled and/or unlabeled data. In some embodiments, the training dataset 452 includes sets of time-series data having predetermined thresholds and/or predetermined anomaly annotations included therein.

At optional step 404, the received training dataset 452 is processed and/or normalized by a normalization module 460. For example, in some embodiments, the training dataset 452 can be augmented by imputing or estimating missing values of one or more features associated with time-series data. In some embodiments, processing of the received training dataset 452 includes outlier detection configured to remove data likely to skew training of an associated model.

In some embodiments, processing of the received training dataset 452 includes removing features that have limited value with respect to training of the associated model.

At step 406, an iterative training process is executed to train a selected model framework 462. The selected model framework 462 can include an untrained (e.g., base) machine learning model configured to iteratively provide changepoint detection, segment detection, and/or determination. The training process is configured to iteratively adjust parameters (e.g., hyperparameters) of the selected model framework 462 to minimize a cost value (e.g., an output of a cost function) for the selected model framework 462. In some embodiments, the cost value is related to the selected framework.

The training process is an iterative process that generates set of revised model parameters 466 during each iteration. The set of revised model parameters 466 can be generated by applying an optimization process 464 to the cost function of the selected model framework 462. The optimization process 464 can be configured to reduce the cost value (e.g., reduce the output of the cost function) at each step by adjusting one or more parameters during each iteration of the training process.

After each iteration of the training process, at step 408, a determination is made whether the training process is complete. The determination at step 408 can be based on any suitable parameters. For example, in some embodiments, a training process can complete after a predetermined number of iterations. As another example, in some embodiments, a training process can complete when it is determined that the cost function of the selected model framework 462 has reached a minimum, such as a local minimum and/or a global minimum.

At step 410, a trained model 468, such as a trained changepoint detection models, trained detection models, and/or trained determination models, is output and provided for use in a time-series anomaly detection process, such as the method 200 discussed above with respect to FIGS. 6-7. At optional step 412, a trained model 468 can be evaluated by an evaluation process 470. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
a processor; and
a non-transitory memory storing instructions that, when executed, cause the processor to:
receive a time-series dataset;
implement an iterative process to define a set of segments from the time-series dataset that:
identifies a set of changepoints in the time-series dataset based on a changepoint type and a sensitivity parameter;
determines whether the set of segments defined by the set of changepoints satisfy at least one predetermined threshold criteria;

when the set of segments do not satisfy the at least one predetermined threshold criteria, modifies the sensitivity parameter; and when the set of segments satisfy the at least one predetermined threshold criteria, outputs the set of segments;

determine a segment-specific anomaly detection threshold for each segment in the set of segments;

generate a set of anomaly-flagged segments, wherein the set of anomaly-flagged segments are generated by an anomaly detection process based on the segment-specific anomaly detection threshold for a corresponding segment; and combine the set of anomaly-flagged segments to generate an anomaly-flagged time-series dataset.

2. The system of claim 1, wherein the changepoint type is a mean, a variance, or a combination thereof.

3. The system of claim 1, wherein the set of changepoints is identified by a trained model having a pruned exact linear time (PELT) framework, a changepoint for a range of penalties (CROPS) framework, or a combination PELT and CROPS framework.

4. The system of claim 1, wherein determining whether the set of segments defined by the set of changepoints satisfy the at least one predetermined threshold criteria comprises:

generating an impact value for each segment in the set of segments; and determining whether a difference in the impact value between a first segment and an immediately prior segment satisfies the at least one predetermined threshold criteria.

5. The system of claim 1, wherein the segment-specific anomaly detection threshold for a first segment is determined by:

calculating a segment impact value for the first segment; calculating an overall impact value for the time-series dataset;

comparing the segment impact value and the overall impact value; and generating the segment-specific anomaly detection threshold based on a comparison of the segment impact value and the overall impact value.

6. The system of claim 1, wherein the set of anomaly-flagged segments are combined by stitching the set of anomaly-flagged segments in sequential time order.

7. The system of claim 1, wherein anomaly detection process comprises a standard deviation-based anomaly detection process.

8. The system of claim 1, wherein the at least one predetermined threshold criteria include a minimum number of data points per segment in the set of segments.

9. A computer-implemented method, comprising:
receiving a time-series dataset;
iteratively defining a set of segments from the time-series dataset by:
identifying a set of changepoints in the time-series dataset based on a changepoint type and a sensitivity parameter;
determining whether the set of segments defined by the set of changepoints satisfy at least one predetermined threshold criteria;
when the set of segments do not satisfy the at least one predetermined threshold criteria, modifying the sensitivity parameter; and
when the set of segments satisfy the at least one predetermined threshold criteria, outputting the set of segments;

determining a segment-specific anomaly detection threshold for each segment in the set of segments;
generating a set of anomaly-flagged segments, wherein the set of anomaly-flagged segments are generated by an anomaly detection process based on the segment-specific anomaly detection threshold for a corresponding segment; and
combining the set of anomaly-flagged segments to generate an anomaly-flagged time-series dataset.

10. The computer-implemented method of claim 9, wherein the changepoint type is a mean, a variance, or a combination thereof.

11. The computer-implemented method of claim 9, wherein set of changepoints is identified by a trained model having a pruned exact linear time (PELT) framework, a changepoint for a range of penalties (CROPS) framework, or a combination PELT and CROPS framework.

12. The computer-implemented method of claim 9, wherein determining whether the set of segments defined by the set of changepoints satisfy the at least one predetermined threshold criteria comprises:
generating an impact value for each segment in the set of segments; and determining whether a difference in the impact value between a first segment and
an immediately prior segment satisfies the at least one predetermined threshold criteria.

13. The computer-implemented method of claim 9, wherein determining the segment-specific anomaly detection threshold for a first segment comprises:
calculating a segment impact value for the first segment;
calculating an overall impact value for the time-series dataset;
comparing the segment impact value and the overall impact value; and
generating the segment-specific anomaly detection threshold based on a comparison of the segment impact value and the overall impact value.

14. The computer-implemented method of claim 9, wherein the set of anomaly-flagged segments are combined by stitching the set of anomaly-flagged segments in sequential time order.

15. The computer-implemented method of claim 9, wherein anomaly detection process comprises a standard deviation-based anomaly detection process.

16. The computer-implemented method of claim 9, wherein the at least one predetermined threshold criteria include a minimum number of datapoints per segment in the set of segments.

17. A non-transitory computer-readable medium having instructions stored thereon that, when executed by a processor, cause a device to perform operations comprising:
receiving a time-series dataset;
iteratively defining a set of segments from the time-series dataset by:
identifying a set of changepoints in the time-series dataset based on a changepoint type and a sensitivity parameter, wherein the changepoint type is a mean, a variance, or a combination thereof;
generating a first impact value for each segment in the set of segments defined by the set of changepoints;
determining whether a difference of the first impact value between a first segment and an immediately prior segment satisfies at least one predetermined threshold criteria;
when the difference does not satisfy the at least one predetermined threshold criteria, modifying the sensitivity parameter; and when the difference satisfies the at least one predetermined threshold criteria, outputting the set of segments;

calculating a second impact value for the time-series dataset;

comparing the first impact value and the second impact value;

generating a segment-specific anomaly detection threshold based on a comparison of the first impact value and the second impact value;

generating a set of anomaly-flagged segments, wherein the set of anomaly-flagged segments are generated by an anomaly detection process based on the segment-specific anomaly detection threshold for a corresponding segment; and combining the set of anomaly-flagged segments to generate an anomaly-flagged time-series dataset.

18. The non-transitory computer-readable medium of claim 17, wherein set of changepoints is identified by a trained model having a pruned exact linear time (PELT) framework, a changepoint for a range of penalties (CROPS) framework, or a combination PELT and CROPS framework.

19. The non-transitory computer-readable medium of claim 17, wherein the second impact value comprises an impact of the first segment with respect to the time-series dataset.

20. The non-transitory computer-readable medium of claim 17, wherein anomaly detection process comprises a standard deviation-based anomaly detection process.

* * * * *